US011343750B2

(12) United States Patent
Demeilliez et al.

(10) Patent No.: US 11,343,750 B2
(45) Date of Patent: May 24, 2022

(54) METHOD FOR THE IDENTIFICATION OF A CONNECTED OBJECT IN A NETWORK INFRASTRUCTURE

(71) Applicant: BULL SAS, Les Clayes-sous-Bois (FR)

(72) Inventors: Bruno Demeilliez, Saint Laurent du Pont (FR); Gilles Menigot, Froges (FR); Wajih Chaabane, Chambery (FR)

(73) Assignee: BULL SAS, Les Clayes-sous-Bois (FR)

( * ) Notice: Subject to any disclaimer, the term of this patent is extended or adjusted under 35 U.S.C. 154(b) by 129 days.

(21) Appl. No.: 16/731,222

(22) Filed: Dec. 31, 2019

(65) Prior Publication Data
US 2020/0213934 A1 Jul. 2, 2020

(30) Foreign Application Priority Data

Dec. 31, 2018 (EP) ..................................... 18306906
May 6, 2019 (FR) ..................................... 1904719

(51) Int. Cl.
*H04W 40/24* (2009.01)
*H04W 8/00* (2009.01)
*H04W 88/16* (2009.01)

(52) U.S. Cl.
CPC ......... *H04W 40/246* (2013.01); *H04W 8/005* (2013.01); *H04W 88/16* (2013.01)

(58) Field of Classification Search
CPC ...... H04L 67/12; H04L 67/16; H04W 40/246; H04W 88/16; H04W 8/005
See application file for complete search history.

(56) References Cited

U.S. PATENT DOCUMENTS

| 9,705,747 | B1* | 7/2017 | Xue ........................ H04L 41/12 |
| 2011/0110271 | A1* | 5/2011 | Arauz-Rosado .... H04L 12/2818 370/255 |
| 2016/0036764 | A1* | 2/2016 | Dong .................. H04L 61/6022 370/254 |
| 2016/0072670 | A1* | 3/2016 | Matthieu ............. H04L 41/0806 709/204 |
| 2018/0007499 | A1* | 1/2018 | Lee ......................... H04W 4/00 |
| 2018/0199297 | A1* | 7/2018 | Chen ................. H04W 52/0216 |
| 2019/0364492 | A1* | 11/2019 | Azizi ..................... H04W 48/16 |

FOREIGN PATENT DOCUMENTS

WO 2007055689 A1 5/2007

OTHER PUBLICATIONS

Tanganelli, et al. "Edge-Centric Distributed Discovery and Access in the Internet of Things." IEEE Internet of Things Journal. vol. 5, No. 1. Feb. 2018. 14 pages.

* cited by examiner

*Primary Examiner* — Saad A. Waqas
(74) *Attorney, Agent, or Firm* — Arc IP Law, PC; Joseph J. Mayo

(57) ABSTRACT

A method is proposed for the identification of a connected object in a network infrastructure which comprises at least two networks of connected objects interconnected by the intermediary of a data transport network. The method enables a connected object to search for and identify one or more other connected objects of the network infrastructure on the basis of specific search criteria. In particular, a connection gateway can, first, receive (201) and process (202) a request, which contains the search criteria, coming from a connected object and, secondly, transmit (203) to said connected object identification information for other connected objects that meet these criteria.

13 Claims, 3 Drawing Sheets

METHOD FOR THE IDENTIFICATION OF A CONNECTED OBJECT IN A NETWORK INFRASTRUCTURE

CROSS-REFERENCE TO RELATED APPLICATIONS

This application claims the benefit of European Patent Application No. 18306906.1 filed Dec. 31, 2018 and French Patent Application No. 1904719 filed May 6, 2019, the disclosures of which are herein incorporated by reference in its entirety.

This invention relates to the field of connected objects and, specifically, the exchange of data within a network infrastructure of connected objects. In particular, it relates to a method for the identification of a connected object in a network infrastructure which comprises at least two connected objects that are interconnected via a data communication network.

PRIOR ART

The Internet of Things (IoT) refers to all objects connected to the Internet and it is a field of Information and Communications Technologies (ICT) that is rapidly growing. In fact, the IoT has applications in more and more varied fields, such as, for example: the smart city, self-driving cars, home automation or even smart home management.

The electronic devices involved in these applications are called connected objects, in the sense that they interact through local sub-networks that can be connected to a high-speed core network, such as the Internet. Several local sub-networks can be integrated into a single network of connected objects. Such a network of connected objects, also hereafter called local network, then comprises several gateway connections, specific to each sub-network, to which are respectively connected one or more connected objects. Each connection gateway ensures the routing of messages that go through, on one hand, among the different connected objects of the local network and, on the other hand, between the connected objects of the local network and a data transport network (such as, for example, the Internet).

Additionally, several local networks can be interconnected, by means of a data transport network. In this case, the connection gateways of the interconnected local networks are connected to connection gateways of the data transport network. Messages can thus travel between connected objects of separate networks of connected objects. In other words, a message can be transmitted by a source connected object of a given network of connected objects and go through several connection gateways, at least one of which is a connection gateway of a data transport network, to the recipient connected object in a different network of connected objects.

In such a configuration, it is particularly useful for a specific connected object to have precise knowledge of the different connected objects of the network infrastructure to which it belongs and with which it can exchange messages. This knowledge assumes that the connected object in question can regularly obtain updated information regarding all of the other connected objects with which it can exchange messages. In particular, a connected object is so much more capable of exchanging messages in an effective and relevant manner within such a network infrastructure if it can identify the other connected objects with which it can interact and determine the characteristics related to these other connected objects. For example, who the manufacturer of another connected object is, what its domain of functionality is or even at what distance it is located in the network infrastructure. Thus, each connected object, before becoming the source of a message, can find out to whom and how it can transmit a message.

Finally, other than the fact that each sub-network can be supported by a technology that is specific to it for its Internet connectivity (for example, with an ADSL Box, a 4G Box, a WiMax connection, a Satellite connection, a mobile telephone), each connection gateway potentially uses one or more different communication interfaces. Typically, the connection gateways of a network of connected objects can use Ethernet interfaces, WIFI interfaces, Bluetooth interfaces, RF433 interfaces or even IrDA interfaces. Thus, a connected object must be able to exchange messages with another connected object in a network infrastructure which connects with each other connection gateways that use different communication interfaces. In other words, each exchanged message is likely to travel through several of the connection gateways which use different communication interfaces.

Patent application WO2007055689 particularly discloses, a source node of a wireless network capable of sending a request (RREQ—Route Request) comprising for example: the address of the source node, the sequence number, the address of the receiving node and the sequence number, the RREQ identifier, the message ID, the length of the message, its lifespan (TTL), the number of jumps, the routing metric, and an Intermediary Response (IR) indicator. The first intermediate node with a valid route to the receiving node responds to the RREQ with an RREP (Route Response) message. The RREP message is sent in unicast to the source node and thus quickly establishes a temporary transfer route to the destination. The intermediary node then transfers the RREQ message to the receiving node. When the source node receives the RREP message, it creates a transfer route to the receiving node. Furthermore, if the receiving node receives other RREQ messages with better metrics (better itinerary), the receiving node updates its itinerary to the source node with the new itinerary. The source node then updates its own routing table. However the system disclosed in this document does not make it possible for a connected object to identify other connected objects with which it can exchange messages.

There are no means or method that can make it possible for a connected object, regardless of what it is, to recognize in the entire infrastructure to which it belongs, all connected objects so as to for example, initiate a cooperation between the connected objects which can particularly be connected within different and fluctuating communications networks. Thus, there is a need for the optimization of data exchanges in one network or several connected object networks.

Technical Problem

The purpose of the invention is to remedy the above-mentioned problems from the prior art. In particular, the purpose of the invention is to propose a method which makes it possible for a connected object to seek and identify one or more other connected objects on the basis of specific search criteria. Furthermore, the method applies to a connected object belonging to a network infrastructure consisting of several networks of connected objects that are interconnected by means of a data transport network. Finally, the method also applies in such a network infrastructure wherein the different connection gateways of the different networks use different communication interfaces.

BRIEF DISCLOSURE OF THE INVENTION

For this purpose, a first aspect of the invention proposes a method for the identification of a connected object in a network infrastructure, said network infrastructure comprising at least two networks of connected objects that are interconnected by means of a data transport network, wherein said connected objects each comprise a plurality of connection gateways to the data transport network, each having their respective communication interfaces, said method comprising the following steps, executed by a first connection gateway of one of the networks of connected objects:
- the reception of a request coming from a source connected object of the network infrastructure, said request comprising specific search criteria;
- the analysis of the correspondence of the search criteria of the request with information related to connected objects of the network infrastructure which are included in a routing list for the connection gateway;
- and, in the case of identification of one or more other connected objects for which a correspondence has been established,
- the transmission, to the source connected object, of information characteristic of the one or more other identified connected objects.

Such a method according to the invention is especially adapted to an implementation in an environment comprising a plurality of connected objects each having functionalities and needs available. In order to ensure optimal cooperation between the connected objects which can specifically be connected within different and fluctuating communications networks, the invention proposes a centralization mechanism for functionalities and needs at the gateway level of the local or remote connected objects to which they can be connected (directly or indirectly).

Thus, the method according to the invention comprises a dissemination of search and publication data at the gateways and the identification, by gateways, of correspondences between the search information on the one hand and the publication information on the other hand.

Additionally, a method according to the invention is particularly suitable where the connection gateways support respective communication interfaces and these respective communication interfaces use different communication protocols. In fact, one of the advantages of the invention is to allow objects using heterogeneous protocols which therefore are not able to normally dialog therebetween, to do so and in addition to share functionalities.

In one embodiment, the search criteria for a request coming from a source connected object comprises one or more of the following criteria:
- a unique universal identifier, UUID, for a connected object;
- an identification data from a functional domain of a connected object;
- an identification data from a manufacturer of a connected object; and,
- a maximum target distance, in the network infrastructure, in relation to the source connected object.

In one embodiment, the information included in the routing list of the connection gateway comprises one point or more of the following information:
- unique, universal identifiers, UUIDs, for local or remote connected objects, to which the connection gateway can transmit messages;
- identification data of the respective functional domains, for local or remote connected objects, to which the connection gateway can transmit messages;
- identification data of respective manufacturers, of local or remote connected objects, to which the connection gateway can transmit messages; and,
- respective distances, in the network infrastructure, separating the connection gateway of local or remote connected objects, to which said connection gateway can transmit messages.

In one embodiment, a correspondence of the request search criteria is established with information relating to a specific connected object, either local or remote, of the network infrastructure whereupon:
- a unique universal identifier, UUID, for a connected object meeting the search criteria is identical to a universal identifier, UUID, for a connected object, either local or remote, included in the routing list of the connection gateway;

or when,
- the identification data of the functional domain and the identification data of the manufacturer of a connected object, comprised in the search criteria, are identical to the function domain and to the manufacturer of the connected object, either local or remote, included in the routing list of the connection gateway and, if applicable,
- the maximum target distance, in the network infrastructure, in relation to the source connected object comprised in the search criteria is greater than or equal to the distance, in the network infrastructure, which separates a remote connected object from the first connection gateway.

In one embodiment, the information characteristic of an identified connected object comprises one or more pieces of the following information:
- universal unique identifier, UUID, of the identified connected object;
- the identification data from the functional domain of the identified connected object;
- the identification data of the manufacturer of the identified connected object;
- the distance, in the network infrastructure, that separates the identified connected object from the source connected object; and,
- the latency associated with a data transmission from the connection gateway to the identified connected object.

In one embodiment, the value of the distance separating a connection gateway from a remote connected object is determined by the number of connection gateways separating said gateway from a connection gateway directly connected to said connected object.

In one embodiment, the information included in a routing list of a connection gateway is stored in a memory of said connection gateway and is updated upon reception, by said connection gateway, with a response message coming from a connected object or with a mesh message from another connection gateway of the network infrastructure.

In one embodiment, a response message, received by a connection gateway, coming from a specific connected object of the network infrastructure, comprises:
- the universal unique identifier, UUID, of said connected object;

the identification data from the functional domain of said connected object;

the identification data of the manufacturer of said connected object;

the distance, in the network infrastructure, that separates said connected object from the source connected object; and, a list of unique universal identifiers of other connected objects of the network of connected objects with which said connected object may communicate.

It can also comprise data related to the functional domain, to the manufacturer and to the distance associated with these said connected objects with which said connected object is likely to communicate.

In one embodiment, a mesh message, received by a connection gateway, coming from a second connection gateway of the network infrastructure comprises the information included in the routing list of said second connection gateway.

In one embodiment, the communication interfaces used by the connection gateways include Ethernet interfaces, WIFI interfaces, Bluetooth interfaces, RF433 interfaces, or IrDA interfaces.

According to a second aspect, the invention also deals with a connection gateway of a network of connected objects adapted for the embodiment of the method according to the first aspect, wherein said network of connected objects is interconnected with another network of connected objects by means of at least one data transport network within a network infrastructure and comprising connection gateways, each having their respective communication interfaces, said connection gateway being characterized in that it comprises:

a reception module configured to receive requests coming from source connected objects of the network infrastructure, said requests comprising specific search criteria;

an analysis module configured to analyze the correspondence of the search criteria of each request with information related to connected objects of the network infrastructure which are included in a routing list for the connection gateway; and an identification module configured to transmit to source connected objects, for each identified connected object for which a correspondence is established, information characteristic of the identified connected object.

According to a third aspect, the invention further relates to a data communication system comprising at least two networks of connected objects that are interconnected by means of a data transport network within a network infrastructure, said networks of connected objects comprising a plurality of connection gateways according to the second aspect.

According to a fourth aspect, the invention finally deals with a connected object of a network of connected objects, said network of connected objects being interconnected with at least one second network of connected objects by means of a data transport network within a network infrastructure and comprising connection gateways, each having their respective communication interfaces, said connected object being connected to a connection gateway adapted for the embodiment of the method according to the first aspect and being characterized in that it comprises:

a request transmitting module configured to issue a request comprising specific search criteria; and, an information receiving module configured to receive information characteristic of identified connected objects.

Other benefits and characteristics of the invention will become evident in the following description, given as an illustrative and non-limiting example, referring to the figures in the attached drawings wherein.

DESCRIPTION OF THE INVENTION

Figure 1:
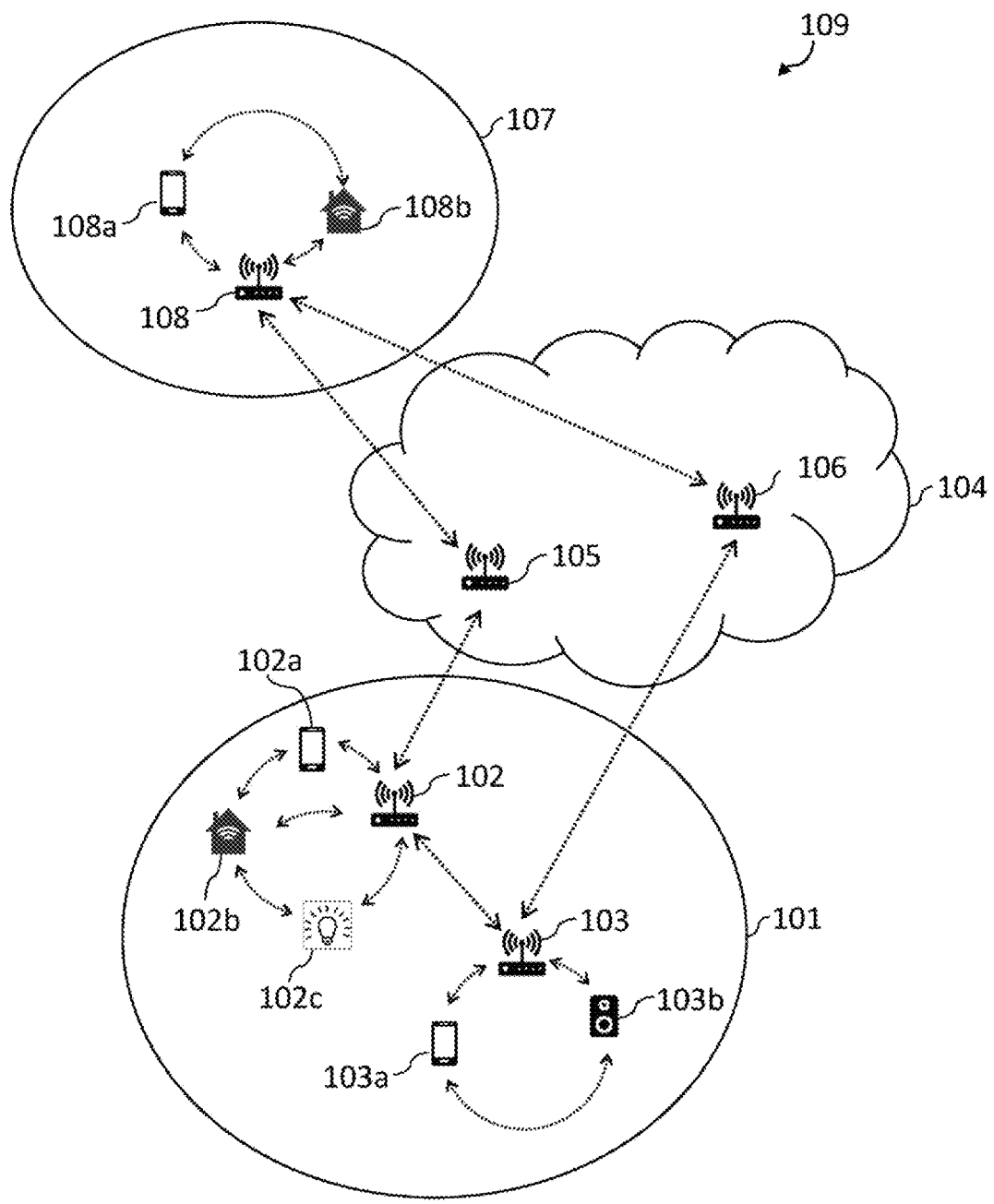
FIG. 1 is a schematic representation of an embodiment of a network infrastructure within which the method can be implemented.

Referring to the diagram in FIG. 1, an embodiment of a network infrastructure in which the method can be implemented will first be described.

In the remainder of the disclosure, a connected object is an electronic object connected, by a wired or wireless connection, to a data transport network, such that the connected object can share data with another connected object, a server, a fixed or mobile computer, an electronic tablet, a smart phone or any other connected device of a given network. In a known manner, such connected objects can be, for example, home automation devices, smart lighting devices, connected speakers or even smart phones. Additionally, in the remainder of the description a connected object is referred to as a local or source a connected object that is connected to the connection gateway that executes the method without the connection using an intermediate connection gateway. In contrast, a remote connected object means a connected object which is connected to the connection gateway that executes the method through at least one other connection gateway.

Gateway or connection gateway, within the meaning of the invention, means equipment ensuring the connection between equipment specific to different local networks or sub-networks, for example, ensuring the connection between equipments of a network of connected objects (local IP addresses) and Internet services (public IP addresses). Thereby, such a gateway has two types of IP addresses. Its public IP address, allocated by the FAI, makes it possible for it to exchange data with the Internet network. Its local IP address makes it possible for it to exchange data with the equipments in its local sub-network. It is generally specific and allocated by default by the FAI.

The expression sub-network or local network, within the meaning of the invention, corresponds, for example, to local networks, each served by at least one connection gateway to another network such as the Internet and to which the connected objects are connected.

Within the meaning of this invention, message or message to be transmitted means a message sent between connected objects through at least one gateway or between a connected object and a gateway, or even between gateways, and comprising data that may include status or environment related information. The format of this data can for example, correspond to files, media streams (video, audio) or coded values.

Within the meaning of this invention, request or request message means a message sent between two connected objects through at least one gateway and comprising data from a connected object. A request message may further comprise an identifier for the selected receiving gateway, messages parameters, and possibly a time range for the transmission of a response message.

Within the meaning of this invention, a response message means a message sent by a connected object, preferably a recipient object, to another connected object, preferably a source object, in response to a request or a request message issued by the source connected object. A response message can be stored or recorded on a storage medium.

Within the meaning of this invention, mesh message means a message sent by gateways in response to a request. A mesh message comprises preferably information included in a routing list.

Within the meaning of this invention, list means a plurality of data elements that allow to indicate specific information, in particular in connection with one or more connected objects or with one or more connection gateways.

The expression communication protocols, within the meaning of this invention means for example data exchange rules between different entities. The communication protocols correspond for example to the wifi, wired network, Bluetooth, Infra-red, Zigbee, LET, 5G and 3G.

To process, calculate, determine, display, extract, compare or more broadly, an executable operation, within the meaning of this invention, means an action executed by a device or processor unless otherwise indicated. In this respect, operations relate to actions and/or processes in a data processing system, for example a computer system or electronic computing device, which manipulates and transforms data represented as physical (electronic) quantities in the memories of the computer system or other devices for storing, transmitting or displaying information. These operations can be based on applications or software programs.

The terms or expressions application, software program, program code and executable code mean any expression, code or notation, in a set of instructions designed to produce data processing to perform a particular function directly or indirectly (e.g., after a conversion operation to another code). Examples of program code can include, without being limited to, a sub-program, a function, an executable application, a source code, an object code, a library and/or any other sequence of instructions designed for execution on a computer system.

Within the meaning of this invention, processor means at least one physical circuit configured to execute operations according to the instructions contained in a code. The physical circuit can be an integrated circuit. Examples of a processor include, but are not limited to, a central processing unit, a graphic processor, an application-specific integrated circuit (ASIC) and a programmable logic circuit. A single processor or several others units can be used in order to implement the invention.

Within the meaning of this invention, substantially identical means a correspondence of the search criteria and information from the routing list varying by less than 30% in relation to compared search criteria and information, preferably from less than 20%, more preferably from less than 10%.

In the example shown in FIG. 1, the networks of connected objects 101 and 107 each allow the different connected objects they comprise to be connected to the data transport network 104, for example, to the Internet, via their connection gateways 102, 103 and 108, respectively. In particular, the connection gateways 102, 103 and 108 are adapted to establish a connection with a connection gateway of the data transport network 104. This connection can, for example, use a wired technology, such as the Ethernet technology, or a wireless technology, such as the 4G technology or the WiMax technology. In the example shown, the connection gateways 102 and 108 establish a communication link with the connection gateway 105 while the connection gateway 103 establishes a communication link with the connection gateway 106 of the data transport network 104.

Each of the three connection gateways 102, 103 and 108 is directly connected to a plurality of connected objects of the network of connected objects to which it belongs. In particular, connection gateway 102 is directly connected with connected objects 102*a*, 102*b* and 102*c*, connection gateway 103 is directly connected with connected objects 103*a* and 103*b* and connection gateway 108 is directly connected with connected objects 108*a* and 108*b*. The expression directly connected means a connection of an object connected to the connection gateway which does not go through any intermediate entity of any kind.

Additionally, the person skilled in the art will understand that the different connected objects which are directly connected to a connection gateway are, in fact, also interconnected therebetween by means of said connection gateway. Finally, each connected object is capable of establishing other connections, i.e. other communications links, with other connected objects, which are not directly connected to the same connection gateway. In other words, a connected object can then be connected to a connection gateway without being directly connected to said gateway. In fact, in this case, it is connected by means of its communications link, which is directly connected to said connection gateway.

Typically, in networks of connected objects, each connection gateway uses one or more communication interfaces specific to it in order to communicate with the connected objects that are directly connected to it. It can, for example, be an Ethernet interface, a WIFI interface, a Bluetooth interface, a RF433 interface or even an IrDA interface. The person skilled in the art in the art will understand that the embodiments of a connection gateway in which this invention can be implemented are not limited either by the number or the type or nature of the connection interfaces which are supported. In any case, an advantage of the method according to embodiments lies in particular in the fact that said method applies in interconnected networks of connected objects which may comprise several connection gateways that use different communication interfaces.

In summary, the connection gateways 102, 103 and 108 of the networks of connected objects 101 and 107 ensure the routing of data and, in particular, of messages, between the different connected objects in the network infrastructure 109 formed by the two networks of connected objects 101 and 107, which are interconnected by the intermediary of the data transport network 104. Additionally, these connection gateways are also adapted to ensure the routing of messages, by their intermediary, from a source connected object that is connected to them, directly or not, to a receiving connected object which is connected to another connection gateway of the network infrastructure 109. Thus, in the example shown in FIG. 1, the connection gateway 102 ensures the routing of the messages exchanged with the data transport network 104 and, if applicable, with a connected object that is connected to connection gateway 103 or to connection gateway 108.

The person skilled in the art will understand that the example described referring to FIG. 1 is not exhaustive. In particular, embodiments of the method may apply to a network infrastructure comprising a number of networks of connected objects greater than two and a number of data transport networks greater than 1. Additionally, each connection gateway can be connected, directly or indirectly, with one or more connected objects without limiting of the number of connection gateways by means of which messages can be transmitted to a receiving connected object within the same network of connected objects or another network of connected objects.

The purpose of the method according to the invention is the identification, by a source connected object, of particular connected objects within the network infrastructure. In other words, the method makes it possible for any type of source connected object to recognize in the whole network infrastructure to which it belongs, all of the connected objects which meet specific search criteria. As a reminder, a source connected object is a connected object that sends or will send a message to another connected object in the network infrastructure, called destination connected object.

Figure 2:
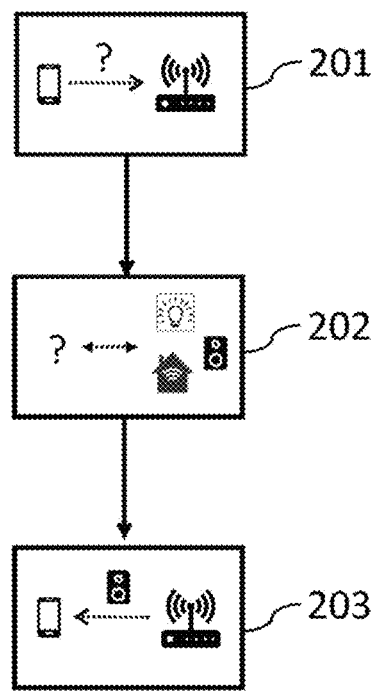
FIG. 2 is a diagram of the steps for the implementation of the method.

Referring to FIG. 2, a diagram of the steps of a method implementation mode will now be described. The method steps are executed by a connection gateway of a network of connected objects of a network infrastructure such as that described in reference to FIG. 1. The person skilled in the art will understand that the method can be executed when a connected object issues a request with search criteria to a connection gateway. Each connected object is thus able to initiate the execution of the steps of the method by a connection gateway in order to regularly update its recognition of the other elements of the network infrastructure to which it belongs.

Thus, during a first step 201, the connection gateway receives a request coming from a source connected object of the network infrastructure. This request comprises specific search criteria. As a reminder, the connected object sending the request is called source connected object in the sense that it can and/or will transmit a message, via one or more connection gateways of the network infrastructure, to another connected object.

The search criteria can be, as an example, but not limited to, a unique universal identifier, UUID, for a connected object, a functional domain of a connected object, a manufacturer of a connected object or even a maximum target distance, in the network infrastructure, in relation to a source connected object. Typically, these search criteria make it possible for the source connected object to thereafter identify other connected objects with which it can exchange messages. For example, because there is a compatibility of the manufacturer(s) of the connected objects involved, or because they are remote, in the network infrastructure, which makes this exchange of messages possible. As a reminder, as known to the person skilled in the art, an UUID is a unique identifier allocated to a connected object which is generated by the manufacturer of said connected object.

Step 202 consists of analyzing the correspondence of the search criteria of the request with information included in a routing list for the connection gateway. Correspondence means that certain parameters of the search criteria and the routing list are substantially identical or sufficiently close within predetermined differences.

Additionally, the information included in the routing list of a connection gateway can be, for example, one or more of the following types of information:
  unique, universal identifiers, UUIDs, for local or remote connected objects, to which the connection gateway can transmit messages;
  respective functional domains, for local or remote connected objects, to which the connection gateway can transmit messages;
  respective manufacturers, of local or remote connected objects, to which the connection gateway can transmit messages; and,
  respective distances, in the network infrastructure, separating the connection gateway of local or remote connected objects, to which said connection gateway can transmit messages.

This information is a non-limiting example of information included in a routing list. Such a list can additionally include additional information related to the communication interfaces that use the connection gateway in question uses for these different connections with connected objects.

Finally, correspondence may mean, for example, finding, in the routing list, a unique universal identifier of a connected object included in the search criteria of the request received by the connection gateway.

Additionally, in a particular embodiment of the method, the correspondence analysis establishes that there is indeed a correspondence of the search criteria with the information in the routing list if:
  a unique universal identifier, UUID, for a connected object comprised in the search criteria is identical to a unique universal identifier, UUID, for a connected object, either local or remote, included in the routing list of the connection gateway;
or if,
  the functional domain and the manufacturer of a connected object, included in the search criteria, are identical to the functional domain and to the manufacturer of a connected object, either local or remote, included in the routing list of the connection gateway and, if applicable, the maximum target distance, in the network infrastructure, in relation to the source connected object comprised in the search criteria is greater than or equal to the distance, in the network infrastructure, which separates a remote connected object from the first connection gateway.

Finally, step 203 is executed when a correspondence is established for a specific connected object. This connected object is referred to as an identified connected object in the sense that it meets all or part of the search criteria of the request issued by the source connected object. In particular, step 203 consists of transmitting, to the source connected object which issued the request, characteristic information of the identified connected object. This characteristic information is the information available to the connection gateway which received the request.

Thus, in a non-limiting way, the information characteristic of an identified connected object can comprise one point or more of the following information:
  unique universal identifier, UUID, of the identified connected object;
  the functional domain of the identified connected object;
  the manufacturer of the identified connected object;
  the distance, in the network infrastructure, that separates the identified connected object from the source connected object; and,
  the latency associated with a data transmission from the connection gateway to the identified connected object.

Advantageously, this characteristic information allows the source connected object to update the information at its disposal with the purpose of exchanging messages with one or more other connected objects of the network infrastructure.

In some embodiments of the method, the distance values used (for the distance parameter included in the routing list and for the target distance parameter included in the search criteria), i.e. the distance separating a connection gateway from a remote connected object corresponds to the number of connection gateways that separate said gateway from a connection gateway which is directly connected to said connected object. Directly connected means being connected without any intermediate element.

Regarding the routing list of the connection gateway, the person skilled in the art will understand that the latter can, for example, be generated and updated regularly by said connection gateway. In particular, in one embodiment of the method, the information included in a routing list of a connection gateway can be stored in a memory of said connection gateway and updated, upon reception, by said connection gateway, of a response message coming from a connected object or from a mesh message from another connection gateway of the network infrastructure. A response message or a mesh message that may be issued, respectively, by a connected object or by a connection gateway, in response to a request received coming from the connection gateway in question. Advantageously, each connection gateway of a connected network can thus require updated information on all other entities of the network infrastructure to which it has access.

Additionally, a response message, received by a connection gateway, coming from a specific connected object of the infrastructure, may, for example, comprise:
the unique universal identifier, UUID, of said connected object;
the functional domain of said connected object;
the manufacturer of said connected object;
the distance, in the network infrastructure, that separates said connected object from the source connected object; and,
a list of unique universal identifiers of other connected objects of the network of connected objects with which said connected object may communicate.

Additionally, a mesh message, received by a connection gateway, coming from a given second connection gateway of the network infrastructure can include all the information included in the routing list of said second connection gateway.

Figure 3:
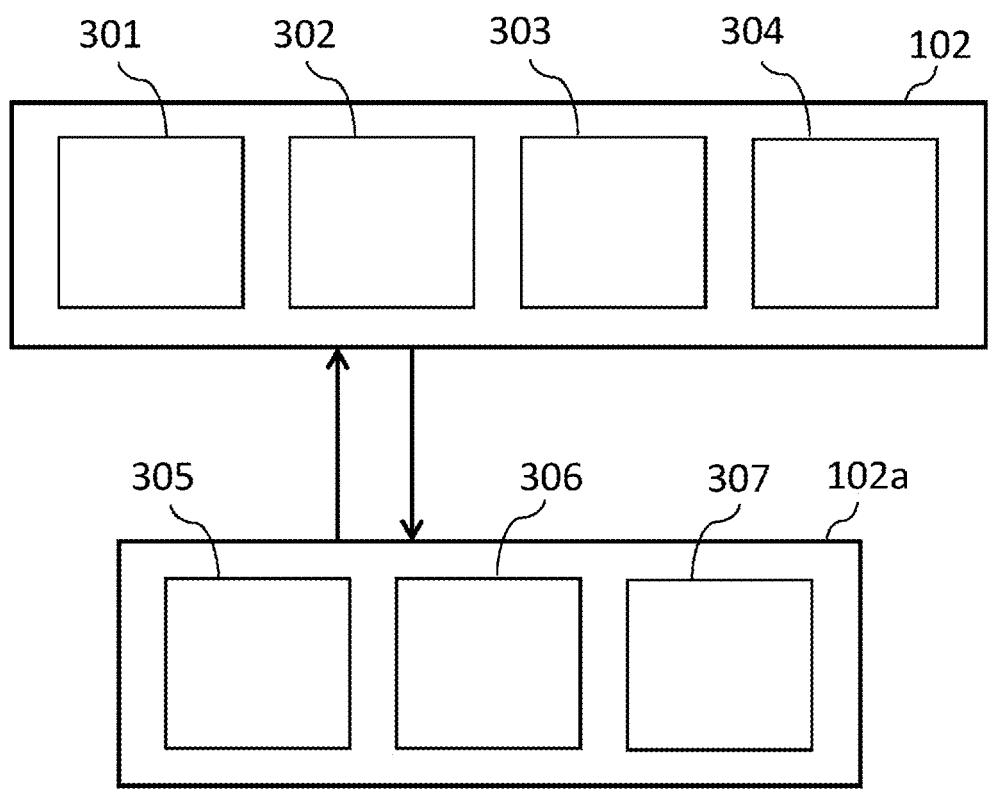
FIG. 3 is a functional drawing of an embodiment of a connection gateway and a connected object according to the invention.

Referring to FIG. 3, a functional diagram of an embodiment of a connection gateway and a connected object according to another aspect of the invention will now be described. The gateway is particularly suitable for carrying out the method described above. In the example shown, the connection gateway 102 thus comprises a reception module 301, an analysis module 302 and an identification module 303. The steps of the method executed by the connection gateway involve an interaction of said connection gateway with the source connected object 102a. In particular, in the example shown, the source connected object 102a comprises a transmitting module 305 and a receiving module 306 which makes this interaction possible. Each module (of the connection gateway and of the source connected object) comprises means making it possible to operate its functions. These means can be combinations of processors, random access memory, read-only memory, cache memory, as well as codes (software) supporting instructions to operate these physical features.

The roles of the different modules of the source connected object and of the connection gateway which interact are disclosed below in the chronological order of the interaction associated with the execution of the steps of the method by the connection gateway.

The transmitting module 305 of the source connected object 102a is thus advantageously configured to issue a request which comprises specific search criteria. This request is sent to the connection gateway.

Receiving module 301 of the connection gateway 102 is therefore configured in order to make it possible for connection gateway 102 to receive requests coming from source connected objects of the network infrastructure. These requests comprise search criteria as described herein before.

Analysis module 302 of connection gateway 102, is configured to analyze the correspondence of the search criteria of each request with information included in a routing list for the connection gateway. In particular, analysis module 302 verifies that the correspondence is established between at least one search criterion and one piece of information from the routing list of the connection gateway before the identification module can intervene.

The identification module 303 of the connection gateway 102 is configured to transmit to source connected objects, for each identified connected object, for which a correspondence is established, information characteristic of the identified connected object.

Finally, the information receiving module 306 of the source connected object 102a is configured to receive information characteristic of one or more connected objects identified by the connection gateway on the basis of the search criteria.

Additionally, the search criteria received by the connection gateway and its routing list can be memorized by a memorization module 304 of the connection gateway. Likewise, the information received from the connection gateway by the information receiving module of the source connected object can be memorized by a memorization module 307. For this purpose, each memorization module may comprise any readable medium known in the art comprising, for example, a volatile memory, such as static random access memory (SRAM) and dynamic random access memory (DRAM), and/or a non-volatile memory, such as read-only memory, flash memories, hard disks, optical disks and magnetic tapes, or in the form of a volatile memory, such as random access memory (RAM) and/or cache memory.

This invention has been described and illustrated in this detailed description and in the figures of the annexed drawings, in possible embodiments. This invention is not, however, limited to any of the embodiments described. Other variants and embodiments can be deduced and implemented by the person skilled in the art when reading this description and seeing the attached drawings.

As previously described, this invention proposes solutions to allow the identification of one or more connected objects based on specific search criteria. A connection gateway of a network of connected objects is thus able to transmit to a source connected object information characteristic of other connected objects of the same network infrastructure with which it may exchange messages. Additionally, the identification can be conducted by the analysis of correspondences of search criteria with information included in a routing list of the gateway which can be regularly updated. Finally, the method applies in a network infrastructure comprised of several networks of connected objects that are interconnected by means of a data transport network and wherein the different connection gateways of the different networks use different communication interfaces.

What is claimed is:

1. A method for identification of a connected object in a network infrastructure, said network infrastructure comprising at least two networks of connected objects that are interconnected by means of a data transport network, said at least two networks of connected objects each comprising a plurality of connection gateways to the data transport network, each comprising their respective communication interfaces, said method executed by a first connection gateway of one of the at least two networks of connected objects and said method comprising:

reception of a request coming from a source connected object of the network infrastructure, said request comprising a search criteria;

analysis of any correspondence of the search criteria of the request with information related to any of the connected objects of the network infrastructure which are comprised in a routing list for the first connection gateway;

and, in case of identification of one or more other of said connected objects for which a correspondence has been established, transmission, to the source connected object, of information characteristic of one or more other identified connected objects, wherein the search criteria of the request coming from the source connected object comprises a maximum target distance, in the network infrastructure, in relation to the source connected object, wherein the information related to the connected objects which are included in the routing list of the first connection gateway comprise respective distances, in the network infrastructure, separating a connection gateway of local or remote ones of said connected objects, to which said first connection gateway can transmit messages, wherein the correspondence of the search criteria of the request is established with information relating to a specific one of said local or remote ones of said connected objects of the network infrastructure when the maximum target distance, in the network infrastructure, in relation to the source connected object comprised in the search criteria is greater than or equal to a distance, in the network infrastructure, which separates the specific one of the connected objects from the first connection gateway, and wherein a response message received by said connection gateway coming from the specific one of said connected objects of the network infrastructure comprises a list of unique universal identifiers of one or more other of said connected objects of the at least two networks of connected objects with which said specific one of said connected objects comprises an established communications link, as well as a functional domain of said specific one of said connected objects, a manufacturer of said specific one of said connected objects and a distance, in the network infrastructure, that separates said specific one of said connected objects from the source connected object, associated with said one or more other of said connected objects.

2. The method for identification according to claim 1, wherein the search criteria of the request coming from the source connected object further comprise one or more of:

a unique universal identifier, UUID, for said source connected object;

an identification data from a functional domain of said source connected object; and, an identification data from a manufacturer of said source connected object.

3. The method for identification according to claim 1, wherein the information related to the connected objects which are included in the routing list of the first connection gateway further comprise one or more of:

unique, universal identifiers, UUIDs, for said local or remote ones of said connected objects, to which the first connection gateway can transmit said messages;

identification data of respective functional domains, for said local or remote ones of said connected objects, to which the first connection gateway can transmit said messages; and, identification data of respective manufacturers, of said local or remote ones of said connected objects, to which the first connection gateway can transmit said messages.

4. The method for identification according to claim 1, wherein the correspondence of the search criteria of the request is further established with information relating to said specific one of said local or remote ones of said connected objects, of the network infrastructure when:

a unique universal identifier, UUID, for a connected object of said connected objects comprised in the search criteria is identical to a unique universal identifier, UUID, for the specific one of the connected object, included in the routing list of the first connection gateway;

or when, identification data of a functional domain and identification data of a manufacturer of a connected object of the connected objects, comprised in the search criteria of the request, are respectively identical to the functional domain and to the manufacturer of the specific one of the connected objects, included in the routing list of the first connection gateway.

5. The method for identification according to claim 1, wherein the information characteristic of an identified connected object of the one or more other identified connected objects comprises one or more of:

universal unique identifier, UUID, of the identified connected object;

a functional domain of the identified connected object;

a manufacturer of the identified connected object;

a distance, in the network infrastructure, that separates the identified connected object from the source connected object; and, a latency associated with a data transmission from the first connection gateway to the identified connected object.

6. The method for identification according to claim 1, wherein a value of a distance separating a specific connection gateway from a remote connected object is determined by a number of connection gateways separating said specific connection gateway from a respective connection gateway directly connected to said specific one of said connected objects.

7. The method for identification according to claim 1, wherein the information included in said routing list of said first connection gateway is stored in a memory of said first connection gateway and is updated upon reception, by said first connection gateway, of said response message coming from said specific one of the connected objects or a mesh message coming from another connection gateway of said plurality of connection gateways of the network infrastructure.

8. The method for identification according to claim 7, wherein said response message received by said connection gateway coming from the specific one of said connected objects of the network infrastructure further comprises:

a universal unique identifier, UUID, of said connected object;

identification data from the functional domain of said specific one of said connected objects; and, identification data of the manufacturer of said specific one of said connected objects.

9. The method for identification according to claim 7, wherein said mesh message, received by said first connection gateway, coming from said another connection gateway of said plurality of connection gateways of the network infrastructure comprises information included in a routing list of said another connection gateway.

10. The method for identification according to claim 1, wherein the communication interfaces used by the plurality of connection gateways comprise Ethernet interfaces, WIFI interfaces, Bluetooth interfaces, RF433 interfaces, or IrDA interfaces.

11. A connection gateway of a network of connected objects configured to implement a method for identification of a connected object in a network infrastructure, said network infrastructure comprising at least two networks of connected objects that are interconnected by means of a data transport network within a network interface, said at least two networks of connected objects each comprising a plurality of connection gateways, each comprising their respective communication interfaces, said method executed by a first connection gateway of one of the at least two networks of connected objects and said method comprising
- reception of a request coming from a source connected object of the network infrastructure, said request comprising a search criteria;
- analysis of any correspondence of the search criteria of the request with information related to any of the connected objects of the network infrastructure which are comprised in a routing list for the first connection gateway;
- and, in case of identification of one or more other of said connected objects for which a correspondence has been established,
- transmission, to the source connected object, of information characteristic of one or more other identified connected objects,
- wherein the search criteria of the request coming from the source connected object comprises a maximum target distance, in the network infrastructure, in relation to the source connected object,
- wherein the information related to the connected objects which are included in the routing list of the first connection gateway comprise respective distances, in the network infrastructure, separating a connection gateway of local or remote ones of said connected objects, to which said first connection gateway can transmit messages,
- wherein the correspondence of the search criteria of the request is established with information relating to a specific one of said local or remote ones of said connected objects of the network infrastructure when the maximum target distance, in the network infrastructure, in relation to the source connected object comprised in the search criteria is greater than or equal to a distance, in the network infrastructure, which separates the specific one of the connected objects from the first connection gateway, and
- wherein a response message received by said connection gateway coming from the specific one of said connected objects of the network infrastructure comprises a list of unique universal identifiers of one or more other of said connected objects of the at least two networks of connected objects with which said specific one of said connected objects comprises an established communications link, as well as a functional domain of said specific one of said connected objects, a manufacturer of said specific one of said connected objects and a distance, in the network infrastructure, that separates said specific one of said connected objects from the source connected object, associated with said one or more other of said connected objects;
- each connection gateway of said plurality of connection gateways comprising:
- a receiving module configured to receive a request from the source connected object of the network infrastructure, said request comprising search criteria;
- an analysis module configured to analyze any correspondence of the search criteria of each said request with information related to connected objects of the network infrastructure which are included in a routing list for the each connection gateway;
- an identification module configured to transmit to the source connected object, for each identified connected object of the one or more other identified connected objects for which a correspondence is established, information characteristic of the each identified connected object.

12. The connection gateway according to claim 11 further comprising:
- a request transmitting module configured to issue said request comprising said search criteria; and,
- an information receiving module configured to receive said information characteristic of said one or more other identified connected objects.

13. A data communication system comprising:
- at least two networks of connected objects that are interconnected by means of a data transport network within a network infrastructure,
- said at least two networks of connected objects comprising a plurality of connection gateways,
- said data communication system configured to implement a method for identification of a connected object in said network infrastructure, said plurality of connection gateways each comprising their respective communication interfaces, said method executed by a first connection gateway of one of the at least two networks of connected objects and said method comprising
- reception of a request coming from a source connected object of the network infrastructure, said request comprising a search criteria;
- analysis of any correspondence of the search criteria of the request with information related to any of the connected objects of the network infrastructure which are comprised in a routing list for the first connection gateway;
- and, in case of identification of one or more other of said connected objects for which a correspondence has been established,
- transmission, to the source connected object, of information characteristic of one or more other identified connected objects,
- wherein the search criteria of the request coming from the source connected object comprises a maximum target distance, in the network infrastructure, in relation to the source connected object,
- wherein the information related to the connected objects which are included in the routing list of the first connection gateway comprise respective distances, in the network infrastructure, separating a connection gateway of local or remote ones of said connected objects, to which said first connection gateway can transmit messages, wherein the correspondence of the search criteria of the request is established with information relating to a specific one of said local or remote ones of said connected objects of the network infrastructure when the maximum target distance, in the network infrastructure, in relation to the source connected object comprised in the search criteria is greater than or equal to a distance, in the network infrastructure, which separates the specific one of the connected objects from the first connection gateway, and wherein a response message received by said connection gateway coming from the specific one of said connected objects of the network infrastructure comprises a list of unique universal identifiers of one or more other of said connected objects of the at least two networks of connected objects with which said specific one of said connected objects comprises an established communications link, as well as a functional domain of said specific one of said connected objects, a manufacturer of said specific one of said connected objects and a distance, in the network infrastructure, that separates said specific one of said connected objects from the source connected object, associated with said one or more other of said connected objects;

each connection gateway of said plurality of connection gateways comprising a receiving module configured to receive a request from the source connected object of the network infrastructure, said request comprising search criteria;

an analysis module configured to analyze any correspondence of the search criteria of each said request with information related to connected objects of the network infrastructure which are included in a routing list for the each connection gateway;

an identification module configured to transmit to the source connected object, for each identified connected object of the one or more other identified connected objects for which a correspondence is established, information characteristic of the each identified connected object.

* * * * *